(12) United States Patent
Hou et al.

(10) Patent No.: US 8,355,535 B2
(45) Date of Patent: Jan. 15, 2013

(54) METHOD AND APPARATUS FOR RECORDING EVENTS IN VIRTUAL WORLDS

(75) Inventors: Jun Hou, Beijing (CN); Dong Jun Lan, Beijing (CN); Sheng Lu, Beijing (CN); Jian Wang, Beijing (CN); Meng Ye, Beijing (CN); Zi Yu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 12/617,883

(22) Filed: Nov. 13, 2009

(65) Prior Publication Data
US 2010/0124360 A1    May 20, 2010

(30) Foreign Application Priority Data

Nov. 14, 2008 (CN) .......................... 2008 1 0171099

(51) Int. Cl.
*G06K 9/00* (2006.01)
(52) U.S. Cl. ....................................... 382/103; 715/758
(58) Field of Classification Search .................. 382/103; 715/758
See application file for complete search history.

(56) References Cited

U.S. PATENT DOCUMENTS

| 7,155,680 | B2 | 12/2006 | Akazawa et al. |
| 7,386,799 | B1 * | 6/2008 | Clanton et al. ................. 715/758 |
| 2007/0143119 | A1 | 6/2007 | Jung et al. |
| 2009/0237518 | A1 * | 9/2009 | Cheng et al. ............. 348/211.99 |

FOREIGN PATENT DOCUMENTS

CN          101268383 A     9/2008

OTHER PUBLICATIONS http://www.noldus.com/news/virtual-observer-offers-new-possibilities-ergonomics-research-and-skills-training, Jan. 9, 2008.

* cited by examiner

*Primary Examiner* — Tom Y Lu
(74) *Attorney, Agent, or Firm* — Scully, Scott, Murphy & Presser, P.C; Gail H. Zarick, Esq.

(57) ABSTRACT

A method and an apparatus for recording an event in a virtual world. The method includes acquiring camera view regions of avatars joining the event; identifying one or more key avatars and/or key objects based on information about the targets in the camera view regions of the avatars; setting one or more recorders for the identified one or more key avatars and/or key objects for recording the event such that the one or more key avatars and/or key objects are located in the camera view regions of the one or more recorders. The apparatus includes devices configured to perform the steps of the method.

14 Claims, 7 Drawing Sheets

METHOD AND APPARATUS FOR RECORDING EVENTS IN VIRTUAL WORLDS

CROSS REFERENCE TO RELATED APPLICATION

This application claims priority under 35 U.S.C. 119 from Chinese Patent Application 200810171099.6, filed Nov. 14, 2008, the entire contents of which are incorporated herein by reference.

BACKGROUND OF THE INVENTION

1. Field of the Invention

The present invention relates to the field of virtual worlds, and more particularly, to a method and an apparatus for recording events in virtual worlds.

2. Description of Related Art

Virtual worlds have attracted more and more attention. For example, there are more and more individuals, companies, organizations and even counties joining in a virtual world such as the "Second Life."

The virtual world provides network users with a world similar to the real world. In the virtual world, an avatar is a virtual image of a network user in the virtual environment. A network user may choose an avatar with various identities and images as his/her own virtual image, and may control the avatar with an input device such as a mouse, a keyboard and the like such that the avatar may perform various activities in the virtual world just like people do in the real world. Optionally, in the virtual world such as "Second Life," users may write scripts by themselves and control avatars with the scripts. Similar to the real world, various events occur in the virtual world every day, such as discussions, games/competitions, sports, live concerts, business, entertainments, shows, educations, art/culture, charity/supporting groups and etc., which are held by the individuals, companies and organizations joining in the virtual world. Generally, for a particular purpose, e.g. for sharing with other users such as users who desire to join the event but are offline, or users who are not invited, and so on, the organizer of the event needs to record the event.

In the prior art, the recording of such events is made manually, and the organizer may let a particular person join the event through controlling an avatar, so as to record the event. This is similar to a cameraman in the real world. The particular person acting as the cameraman may record all visions seen by the avatar by means of a screenshot software and the like.

This manner is simple but the record effect is heavily dependent on the capability and experience of the particular person. Optionally, a plurality of particular persons should be appointed to perform the recording if it is desired to acquire scenes in different points of views. Moreover, the manner of recording manually may consume a mass of human efforts and material resources for there are a great many of events occurring in the virtual world. Therefore, how to record events efficiently is a current challenge.

SUMMARY OF THE INVENTION

In accordance with one aspect of the present invention, a computer-implemented method for recording an event in a virtual world, includes the steps of: acquiring camera view regions of avatars joining in the event; identifying one or more key targets based on information about the targets in the camera view regions of the avatars; and setting one or more recorders for the identified key targets for recording the event so the key targets are located in the camera view regions of the recorders.

In accordance with another aspect of the invention, apparatus for recording an event in a virtual world includes: an acquisition device configured for acquiring camera view regions of avatars joining in the event; an identification device configured for identifying one or more key targets based on information about the targets in the camera view regions of the avatars; and a setting device configured for setting, for the identified key targets, one or more recorders for recording the event sot the key targets are located in the camera view regions of the recorders.

BRIEF DESCRIPTION OF THE DRAWINGS

Features of the present invention will become more apparent from detailed explanation on the embodiments with reference to the accompanying drawings. The same numerals indicate the same or the corresponding parts throughout the figures, wherein.

DESCRIPTION OF THE PREFERRED EMBODIMENTS

Figure 1:
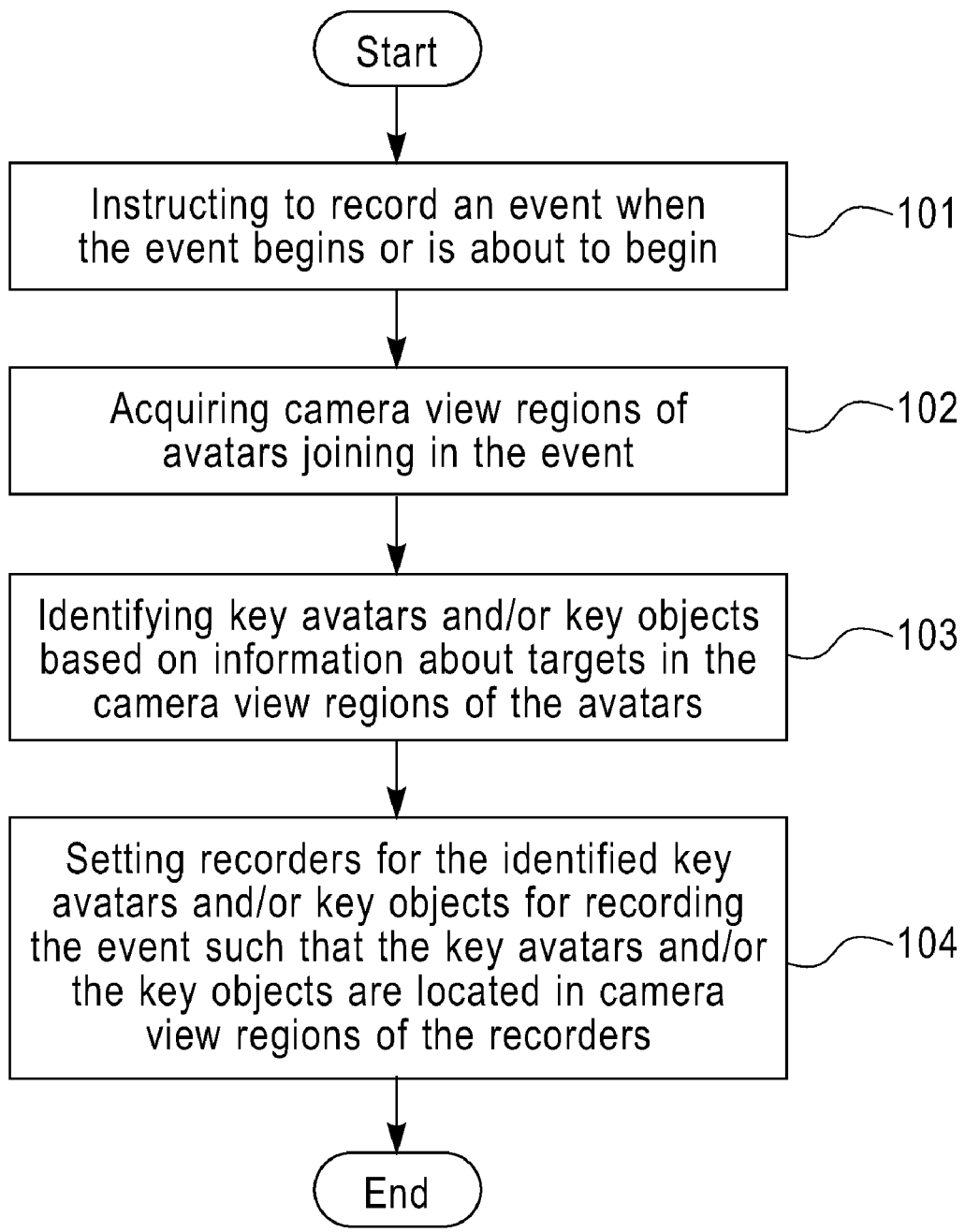
FIG. 1 is a flowchart of a method for recording an event in a virtual world according to an exemplary embodiment of the present invention.

One object of the present invention is to provide a method and an apparatus for recording an event in the virtual world, which may implement automatic recording of the event.

According to a first aspect of the present invention, a method is provided for recording an event in a virtual world. The method may include acquiring camera view regions of avatars joining in the event; identifying one or more key targets based on information about the targets in the camera view regions of the avatars; setting for the identified one or more key targets for the identified one or more key targets such that the one or more key target are located in camera view regions of the one or more recorders.

According to an embodiment of the first aspect of the present invention, the method further includes grouping the key targets based on distances there between so that the key targets, the distances between which are less than a predefined threshold, are grouped into a same group, wherein setting one or more recorders further includes setting the recorders for each group such that the key targets in the each group are located in the respective camera view regions of the recorders.

According to another embodiment of the first aspect of the present invention, setting one or more recorders further includes setting the recorders such that the key targets are located in central positions of the camera view regions of the recorders.

According to yet another embodiment of the first aspect of the present invention, setting one or more recorders further includes setting the recorders such that faces of the key targets are located in the camera view regions of the recorders.

According to still another embodiment of the first aspect of the present invention, the information about the targets in the camera view regions may include at least one of frequencies, times and length of duration that targets appear in the camera view regions.

According to still another embodiment of the first aspect of the present invention, the method further includes setting a secondary recorder such that its camera view region is identical to the camera view region of the avatar identified as the key target, According to still another embodiment of the first aspect of the present invention, the method further includes setting a secondary recorder such that its camera view region includes non-key objects.

According to yet another embodiment of the first aspect of the present invention, the method further includes setting one or more overall recorders so as to record the overall scene of the event from different points of view.

According to a second aspect of the present invention, there is provided an apparatus for recording an event in a virtual world. The apparatus may include an acquisition device which is configured to acquire camera view regions of avatars joining in the event; an identification device which is configured to identify the one or more key targets based on information about the targets in the camera view regions of the avatars; and a setting device which is configured to set one or more recorders for the identified one or more key targets for recording the event such that the one or more key targets are located in camera view regions of the one or more recorders.

According to the embodiments of the present invention, a common point of interest of avatars joining in the event is acquired through acquiring camera view regions of avatars joining in the event, based on the information from which key avatars and/or key objects in the event may be identified. Therefore, recorders may be set for the identified key avatars and/or key objects, implement automatic recording of the event, thereby saving costs and enhancing the efficiency.

Hereinafter, a method and an apparatus for recording an event in a virtual environment according to embodiments of the present invention are described in detail with reference to the drawings.

At first, the method for recording an event in a virtual world according to embodiments of the present invention is described with reference to FIGS. 1-5.

Referring to FIG. 1, there is shown a flowchart of a method for recording an event in a virtual world according to an exemplary embodiment of the present invention.

First, in step 101, when an event starts or is about to start, it is instructed to record the event.

Figure 2:
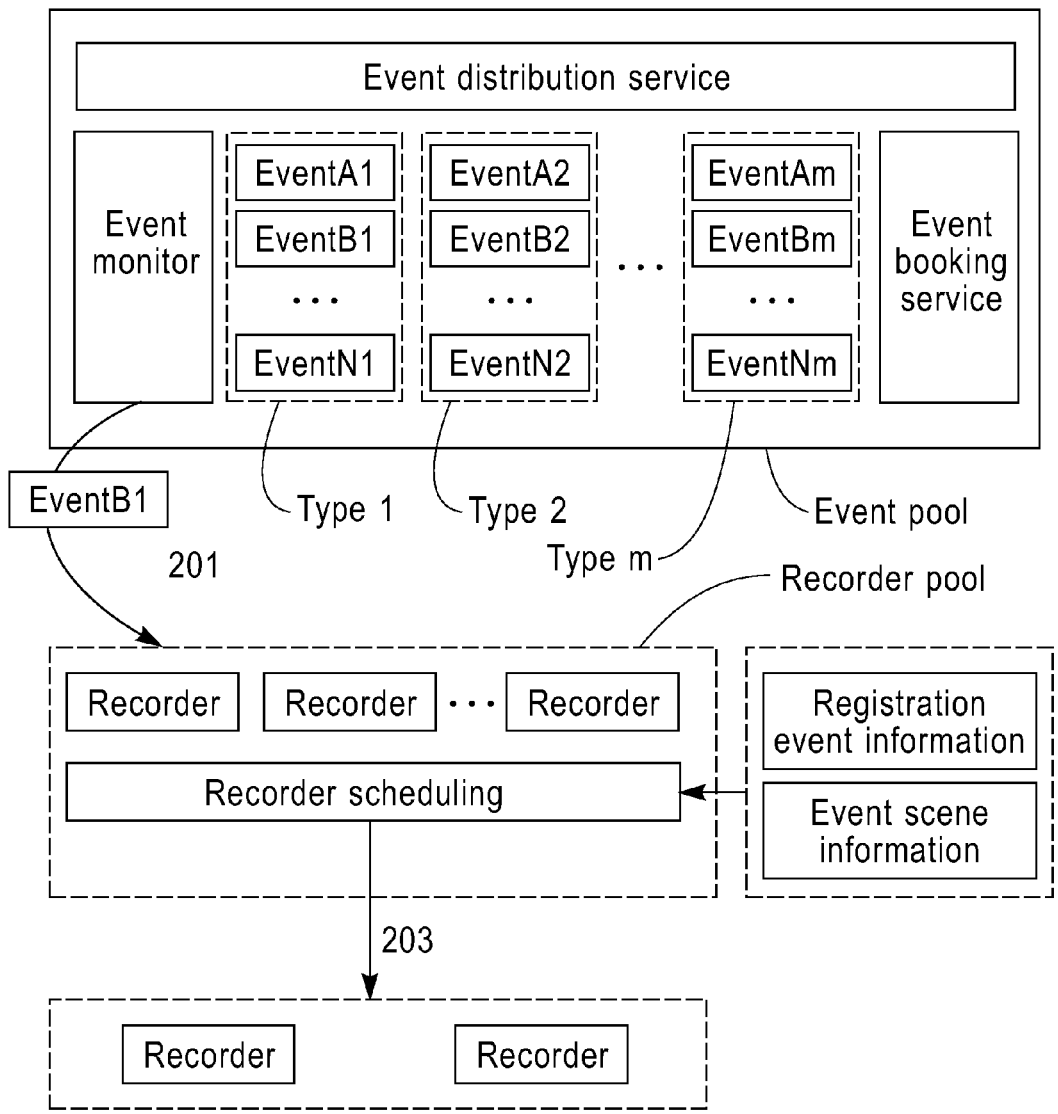
FIG. 2 is a diagram of a procedure of recording an event in a virtual world according to an exemplary embodiment of the present invention.

In the virtual world, all kinds of events to be held should be registered in a server so that these events may be managed. For example, as shown in FIG. 2, when an individual, a company, an organization or the like wants to hold an event, he/she needs to register the event in the server through an event booking service. After the registration, the event is distributed for example through an event distribution service, and the event is stored in an event pool per types such that the timing of the event is monitored by an event monitor.

In the server, there is generally stored registration information related to the event as follows:
 chair;
 keynote speaker;
 participants;
 event duration (×month×date, ×year, from×time×minute to×time×minute);
 event location (x, y, z).

With such registration information, the event monitor may monitor and manage these events.

When the event monitor detects an event's starting time reaches or is about to reach, it instructs to record the event, as shown by an arrow 201 in FIG. 2.

Next, in step 102, camera view regions of avatars joining in the event are acquired.

After the instruction for recording the event is received, is the system starts to monitor the avatars joining in the event, so as to acquire the camera view regions of the avatars.

The avatars joining in the event may be determined in various manners. For example, the avatar joining in the event may be determined based on an event space, i.e., a three-dimensional space in the virtual world where the event takes place and three-dimensional coordinates of the avatar in the virtual world.

In one embodiment of the present invention, the event space may be obtained from the server based on the event location. The event location is generally the three-dimensional coordinates of the event in the virtual world, and there generally exists in the system three-dimensional space data corresponding to the event location, whereby the event space may be acquired. For instance, the event location is a hall of a certain building, and the three-dimensional space of the hall defined in the system is the event space. Consequently, the avatars joining in the event may be determined through determining the avatars whose coordinate positions are within the event space.

According to one embodiment of the present invention, information associated with the event space is included in the event registration information, whereby the event space may be acquired. Thus, the avatars joining in the event may be determined based on the event space and the coordinates of the avatar.

In another embodiment of the present invention, a suitable space, for example a hemispheric space with the three-dimensional position coordinates of the event being the center of the sphere or any suitable three-dimensional space with the three-dimensional position coordinates of the event being reference points, may be determined based on the type or properties of the event location or based on experiences. Therefore, the avatars joining in the event may be determined based on the determined suitable space and the coordinate positions of the avatars.

Optionally, for an event where only a person with special permission is allowed to join, the avatars joining in the event may be determined by determining whether the person with the special permission join in the event indeed or not. It should be noted that embodiments of the present invention is not limited to this, but may use any other appropriate manners to determine the avatars joining in the event.

Optionally, in the virtual world, each avatar is usually set with one camera, and the camera shows the scene which may be seen from a display by a network user manipulating the avatar; in other words, the image in the camera view region is just the content seen by the network user, which reflects a point of interest of the network user.

As known by those skilled in the art, the image in the avatar's camera view region may be acquired at the server. For example, there may be recorded in the server the images in the camera view region of the avatars joining in the event. The avatars' camera view regions may be obtained continuously in a time interval such as several seconds (for example, 5 seconds) to acquire images enough for identification.

It should be noted that the obtainment of the camera view region of the avatar may be implemented in various manners, for example, using the screenshot manner to record the images in the camera view regions of the avatars. Optionally, the obtainment of the camera view regions of the avatars may be implemented by storing image data within the camera view region of the avatars at the server, wherein the stored image data may be used to "recover" the images.

Next, in step 103, a key avatar and/or a key object are identified based on the information about the targets in the camera view regions of the avatars.

The image in the camera view region of each avatar reflect the contents that the respective network user see or is interested in, and thus an avatar and/or an object focused by network users together, namely a key avatar and/or a key object, may be known based on the information in each camera view region of the avatar. The key avatar and/or the key object may be referred to as key targets collectively. Correspondingly, other avatars and/or objects than the key targets in the scene may be referred to as non-key targets collectively.

The server may learn scenario information of the event location, such as coordinate positions of objects in the event region, coordinate positions of the avatars joining in the event and the like, from the registered event information and especially the event location. With the scenario information and in combination with the view angle of the camera view region of the avatar, it may obtain information useful for setting the recorders from the camera view regions of the monitored avatars joining in the event. The information may include, for example, the avatar and/or the object appearing in each camera view region of the avatar. Thereby, the avatars and/or the objects appearing in the camera view regions of the monitored avatars and the times that the avatars and/or the objects appears in the camera view regions of the avatars may be further acquired. Moreover, this associated information may be stored in a table shown as below.

TABLE 1

A table for storing information about the targets in the camera view regions of the avatars

| Object/avatar | Appearance times | Position (x, y, z) | Other information |
|---|---|---|---|
| Object 1 | 11 | <8.1, 8.1, 1> | Key object |
| Object 2 | 1 | <1, 1, 1> | |
| Object 3 | 0 | <100, 10, 10> | |
| ... | ... | ... | |
| Avatar 1 | 10 | <8, 8, 1.5> | Chair |
| Avatar 2 | 9 | <8.1, 8.3, 2.1> | Keynote speaker |
| Avatar 3 | 0 | <20, 15, 1.6> | |
| ... | ... | ... | |

Table 1 shows an example of statistic information about the targets in the camera view regions of avatars joining in the event, which is acquired in the case of the event of the "discussion" type.

Then, the statistic information in table 1 may be used to identify the key avatars and/or the key objects. For instance, an avatar whose appearance times exceeds a threshold may be identified as a key avatar, and an object whose appearance times exceeds another threshold may be identified as a key object. As for object 1 in the above table, for example, a display for showing PPT presentations, it may be determined as a key object since it is the object with the highest appearance times in the avatars' camera view regions. Similarly, avatars 1 and 2 may be determined as key avatars based on the appearance times. According to one embodiment, only the object with the highest appearance times may be determined as the key object, and the avatar with the highest appearance times as the key avatar. That is, the key targets may be one or more. Optionally, the identity of the avatar may be further identified based on the appearance times. For example, avatar 1 is the chair for it has the highest appearance times, and avatar 2 is the speaker. The identified information such as key objects, key avatars and the like, or the further identified identity information like chair, speaker and so on, may be written into corresponding positions in table 1 as "other information", as shown in the third column of table 1.

It should be noted that the identification rules, the identities and the like may be different for different types of events. The above-described identification rules are only for illustrative purpose, and the present invention is not limited to this. Appropriate identification rules, identities and the like may be determined based on the event type and properties.

Optionally, the information, based on which the key avatars and/or the key objects are identified, is not limited to the appearance times of object and/or avatar, but also may be the appearance frequency of objects or avatars, that is, the ratio of the number of appearance against the number of all participating avatars during the time duration, the time length of the appearance of the object or the avatar, or any other appropriate information.

Next, in step 104, recorders for recording the event are set as to the identified key avatar and/or key object such that the key avatar and/or the key object are located within the camera view regions of the recorders.

After identifying the key avatars and/or the key objects, recorders may be set for the key avatars and/or the key objects to record the event, as shown by an arrow 203 in FIG. 2. Those skilled in the art should appreciate that one recorder may be set for each key avatar and/or key object respectively, or one recorder may be set for multiple key avatars and/or key objects, that is, the number of recorders for recording key objects may be set flexibly.

Figure 3:
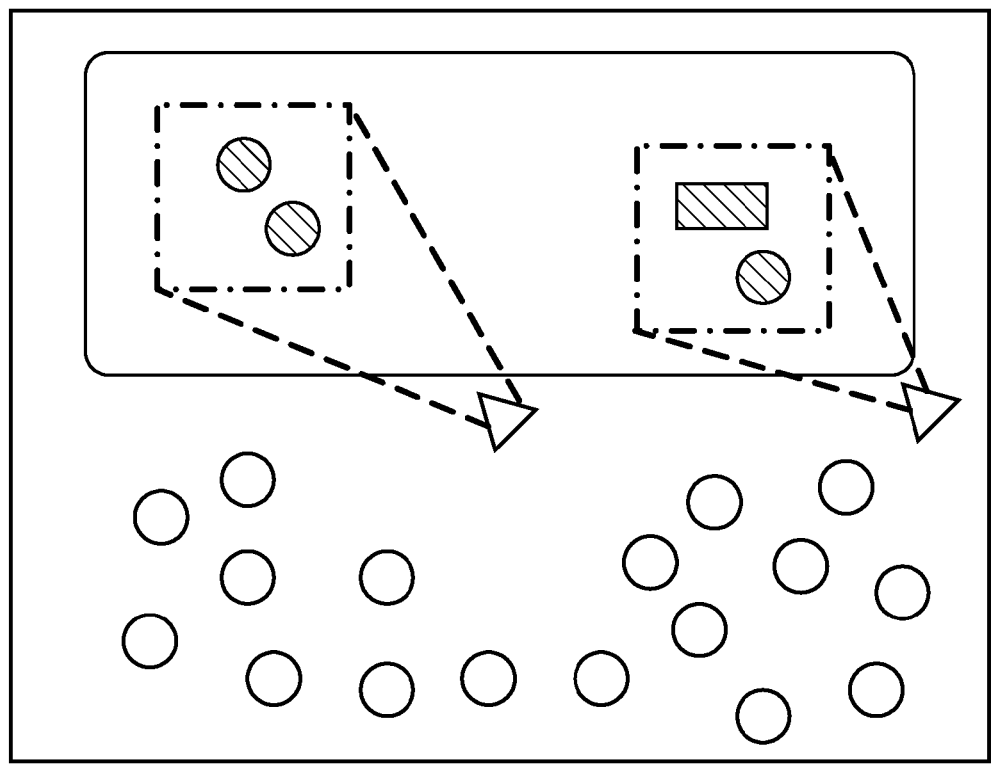
FIG. 3 is a diagram of a recorder setting for key avatars and key objects according to an exemplary embodiment of the present invention.

In an embodiment, key avatars and/or key objects may be further grouped. Referring to FIG. 3, there is shown a diagram of a recorder setting for key avatars and key objects according to an exemplary embodiment of the present invention. As shown in FIG. 3, the key avatars and/or the key objects may be grouped based on the distances there between so as to allocate the key avatars and/or the key objects, between which the distances are lower than a pre-defined threshold, to a same group. In FIG. 3, two regions enclosed by broken lines indicate two different groups after grouping. Avatars and/objects within the respective region belong to a same group. Then, two recorders may be set for each group such that the key avatars and/or the key objects in the group may be located in the camera view region of the respective recorder. As shown in FIG. 3, a triangle is used to represent a recorder, and two dashed lines extended from the triangle indicate borders of the camera view region of the recorder. The pre-defined threshold may be selected according to the requirements for event recording quality so as to minimize the number of recorders while satisfying the requirements for recording qualities.

In another alternative embodiment, the recorder may be further set such that the key avatar and/or key object is located at the central position of the camera view region of the recorder, thereby obtaining a record with better quality.

The recorder may be set at the front, the sides or even the back of the object. However, in another alternative embodiment, the recorder is set so as to make faces of the key avatar and/or the key object within the camera view region of the recorder.

Figure 4:
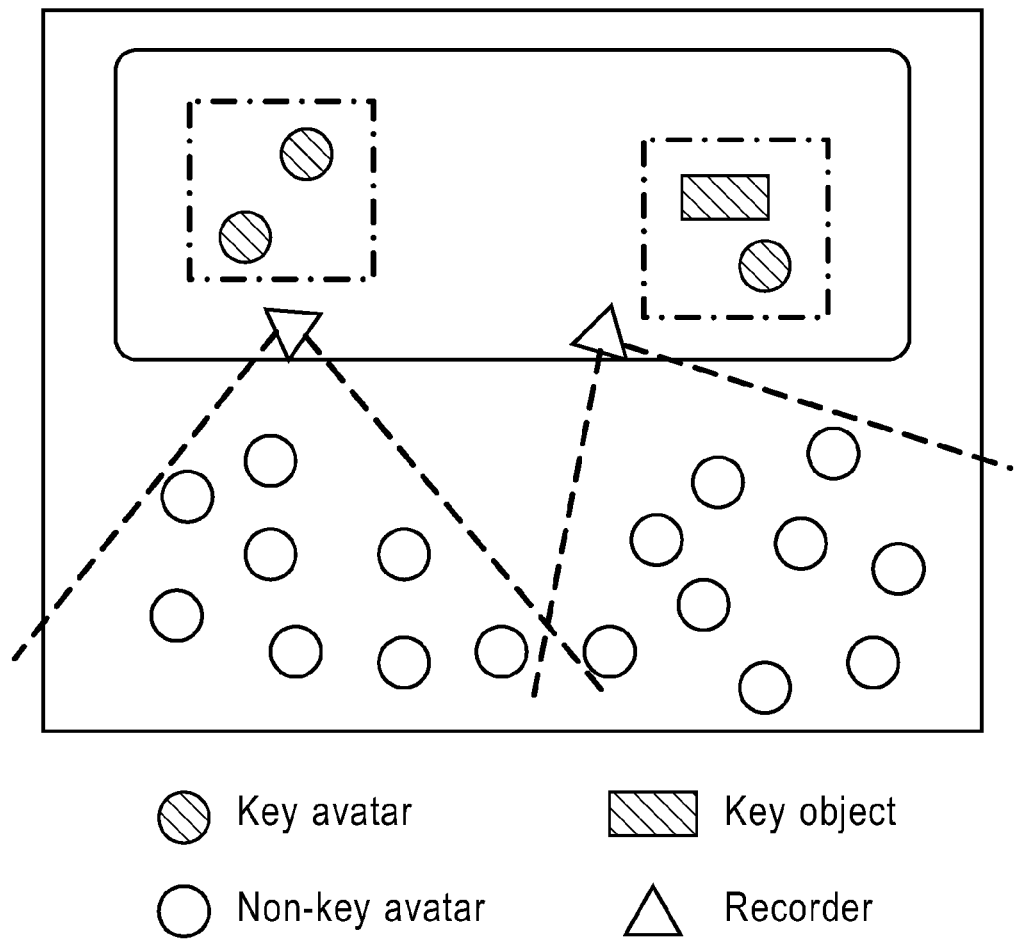
FIG. 4 is a diagram of a secondary recorder setting for non-key avatars according to an exemplary embodiment of the present invention.

Optionally, a secondary recorder may be set to perform a more complete event recording, such that its camera view region is identical to the camera view region of the key avatar, as shown in FIG. 4. The key avatar is usually the most active in the event, and often the images in his camera view region are quite related to the field situation. Therefore, a record more suitable for the field situation may be acquired through setting the secondary recorder in such a manner. In case that there are multiple key avatars, multiple recorders with same camera view regions as the camera view regions of each of the multiple key avatars may be set, or one or more recorders with same camera view regions as the camera view regions of one or more of the multiple key avatars may be set.

Optionally, recorders may be set with other manners as well. In another embodiment of the present invention, one or more secondary recorders may be set such that their camera view regions include non-key avatars, preferably, as many non-key avatars as possible, and more preferably, all non-key avatars.

Figure 5:
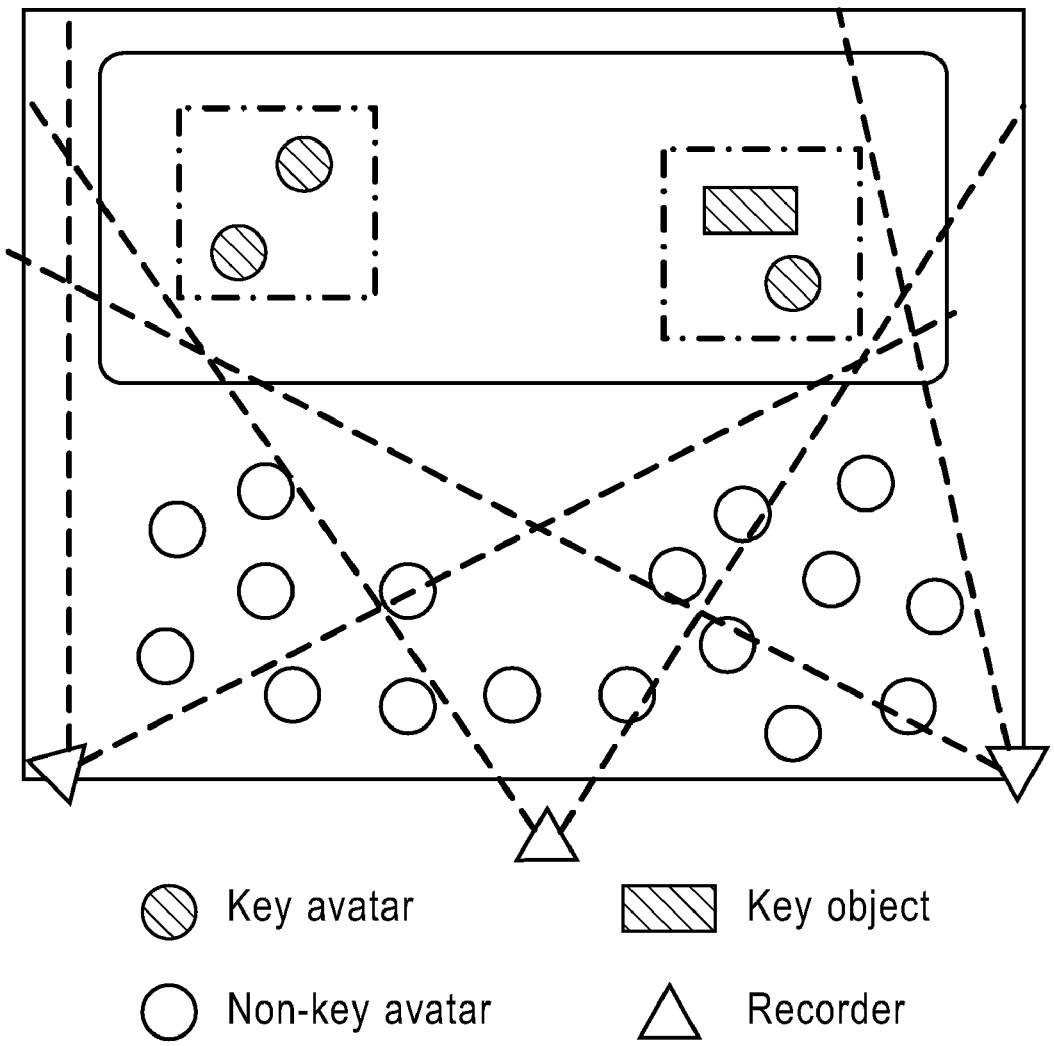
FIG. 5 is a diagram of an overall scene recorder setting according to an exemplary embodiment of the present invention.

Further, one or more overall scene recorders may be set as shown in FIG. 5 to record the overall scene of the event from different points of views.

It should be noted that the recorder may record the event in many manners. For instance, the images in the camera view region of the recorder may be recorded in the screenshot manner, and in this case, more data are needed to be recorded, but a higher quality may be achieved. Optionally, data of images in the camera view region of the recorder may also be recorded at the server. When needed, the scene may be "recovered" from the stored image data.

It should be noted that, before the key avatar and/or the key object are identified and a recorder is set for recording the event, for example, an overall scene recorder may be set firstly so as to record the event before recording according the method of the present invention.

The data of images recorded by the recorder may be stored in a particular storage repository as video data for viewing later; or, may be provided as a live broadcast service for other users' real-time watching.

Optionally, those skilled in the art should appreciate that in step 102, the camera view regions of all or part of avatars joining in the event may be acquired, as long as the key avatar and/or key object may be identified reliably.

Further, although embodiments of variously setting the recorder are shown in an ichnography in FIGS. 3-5 for the purpose of clear diagrammatic representation, it should be noted that the camera view region of the recorder and the region range of the group are actually of a three-dimensional shape.

It should be noted that features in various embodiment of the present invention may be combined into new embodiments, as long as the combinations of these features do not depart from the spirit of the present invention.

The method for recording events according to embodiments of the present invention acquire a common point of interest of avatars joining in the event through acquiring camera view regions of avatars joining in the event, and identifies key avatars and/or key objects in the event. Then, recorders may be set for the identified key avatars and/or key objects automatically, thereby implementing an automatic recording of events. Therefore, the cost is saved and the efficiency is improved with the method according to embodiments of the present invention.

Hereafter, the apparatus for recording an event in a virtual world according to embodiments of the present invention is described with reference to FIGS. 6-7.

Figure 6:
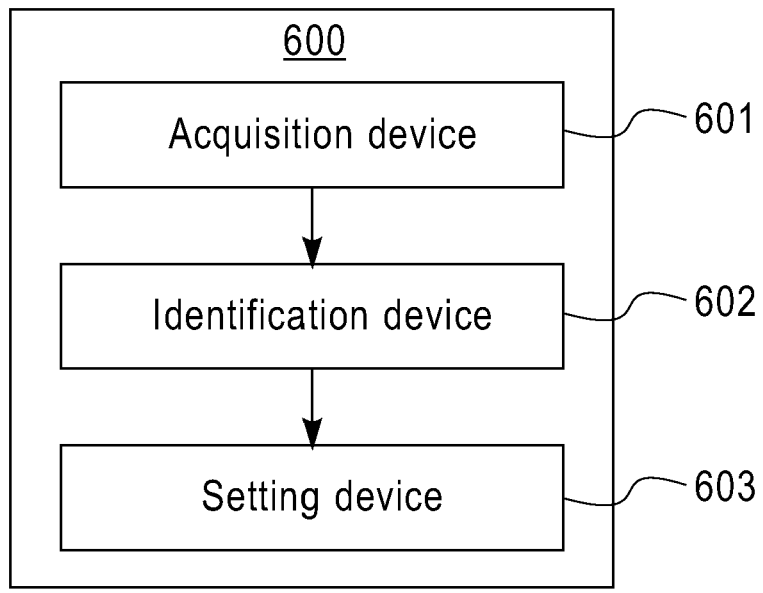
FIG. 6 is a block diagram of an apparatus for recording an event in a virtual world according to an exemplary embodiment of the present invention.

FIG. 6 shows a block diagram of an apparatus 600 for recording an event in a virtual world according to an exemplary embodiment of the present invention. As shown in FIG. 6, the apparatus 600 may include an acquisition device 601, an identification device 602 and a setting device 603.

Specifically, the acquisition device 601 may be configured to acquire camera view regions of avatars joining in the event; the identification device 602 may be configured to identify one or more key avatars and/or key objects based on information about the targets in the camera view regions of the avatars; and the setting device 603 may be configured to set, for the identified key avatars and/or key objects, one or more recorders, such that the key avatars and/or the key objects are located in the camera view regions of the recorder.

Figure 7:
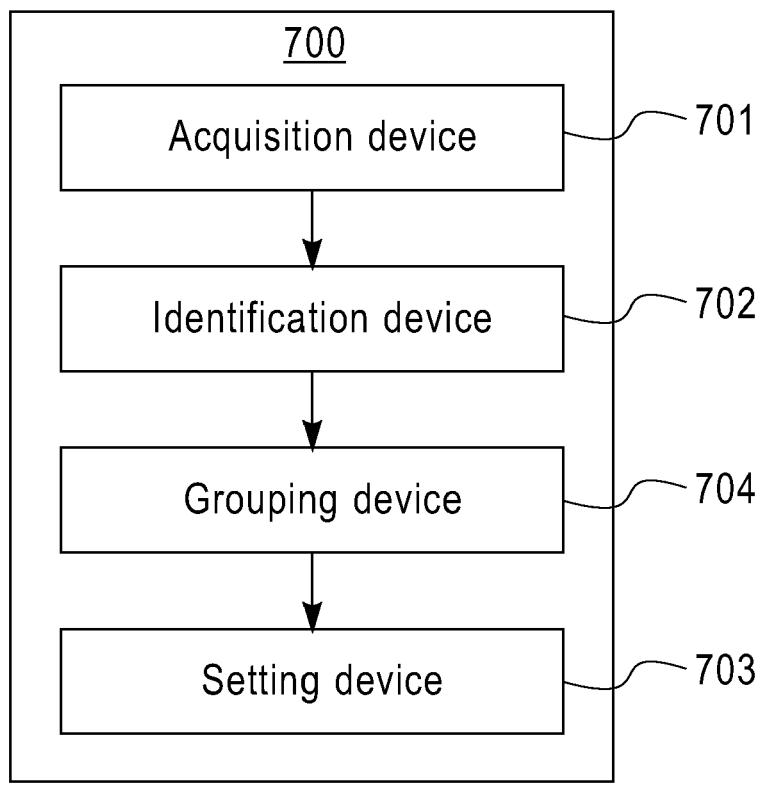
FIG. 7 is a block diagram of an apparatus for recording an event in a virtual world according to another exemplary embodiment of the present invention.

FIG. 7 shows a block diagram of an apparatus 700 for recording an event in a virtual world according to another exemplary embodiment of the present invention. As shown in FIG. 7, the apparatus 700 may include an acquisition device 701, an identification device 702, a setting device 703 and a grouping device 704.

In FIG. 7, the acquisition device 701 corresponds to the acquisition device 601 in FIG. 6; the identification device 702 corresponds to the identification device 602 in FIG. 6; and the setting device 703 corresponds to the setting device 603 in FIG. 6. Differing from the apparatus 600 shown in FIG. 6, the apparatus 700 may further include a grouping device 704. The grouping device 704 may be configured to group the key avatar and/or key objects based on the distances there between so that the key avatars and/or the key objects, the distances between which are less than a pre-defined threshold, may be grouped into a same group, and the setting device 703 may be further configured to set recorders for each group such that the key avatars and/or the key objects within the group are located in the camera view region of the recorder set for that group.

Recorders set for key avatars and/or key objects may be reduced and thus system resources may be saved through grouping the key avatars and/or the key objects.

In an alternative embodiment of the present invention, the setting device 603 or 703 may be further configured to set the recorders so that the key avatars and/or the key objects are located in the central positions of the camera view region of respective recorders.

In an alternative embodiment of the present invention, the setting device 603 or 703 may be further configured to set the recorders so that faces of the key avatars and/or key objects are located in the camera view regions of the recorders.

In another alternative embodiment of the present invention, the information about the targets in the camera view region may include at least on of frequencies, times or length of duration that the objects and/or avatars appear in the camera view regions.

According to yet another alternative embodiment of the present invention, the setting device 603 or 703 may be further configured to set a secondary recorder such that its camera view region is identical to the camera view region of the key avatar.

According to yet another alternative embodiment of the present invention, the setting device 603 or 703 may be further configured to set a secondary recorder such that its camera view region includes non-key avatars, preferably, as many non-key avatars as possible, and more preferably, all non-key avatars.

According to still another alternative embodiment of the present invention, the setting device 603 or 703 may be further configured to set one or more overall scene recorders so as to record the overall scene of the event from different points of views.

It may be seen from the descriptions of the apparatus for recording the event in the virtual world according to embodiments of the present invention that the apparatus according to embodiments of the present invention may implement automatically recordings of the event, thereby saving costs and improving efficiencies.

Hereinafter, a computing device suitable to implement embodiments of the present invention with reference to FIG. 8 which schematically illustrates a structural block diagram of a computing device in which an embodiment according to embodiments of the present invention may be implemented.

Figure 8:
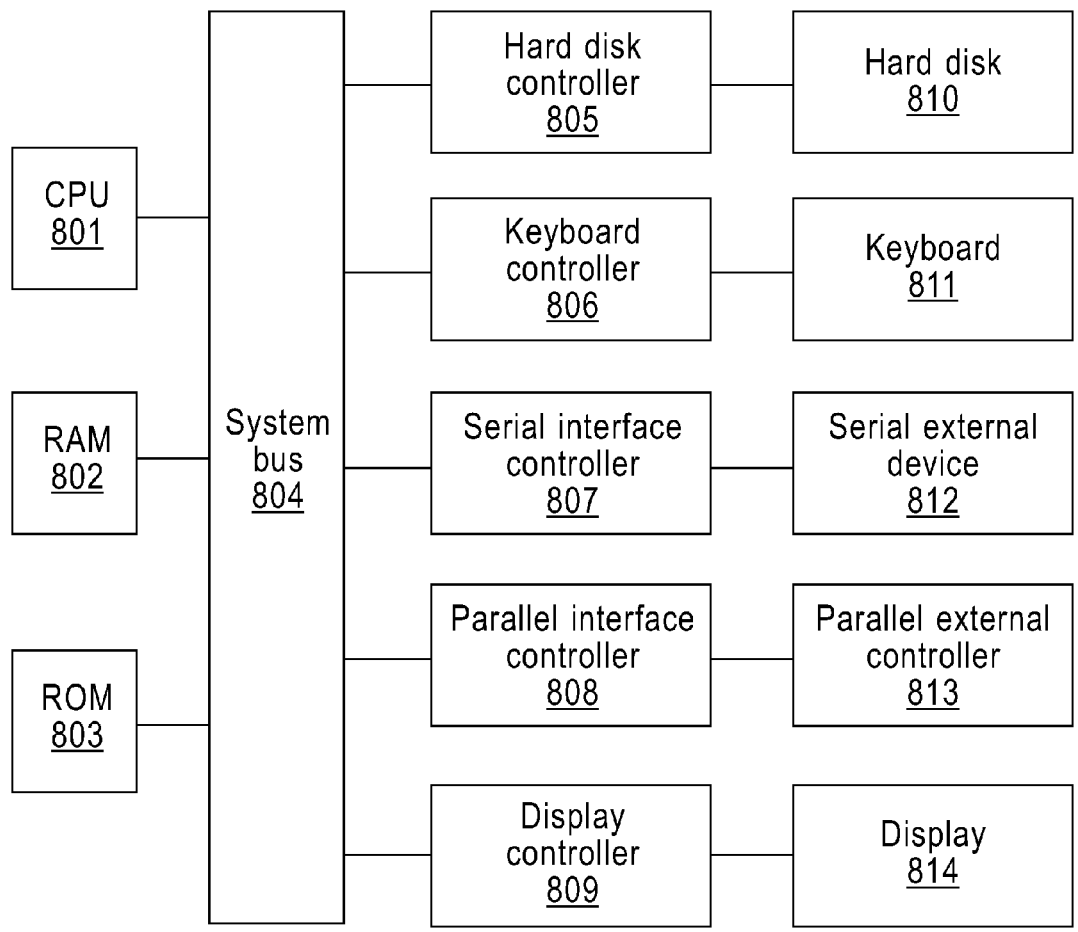
FIG. 8 is an exemplary structural block diagram of a computer system in which the embodiments according to embodiments of the present invention may be implemented.

The computer system as shown in FIG. 8 includes a CPU (Central Processing Unit) 801, a RAM (Random Access Memory) 802, a ROM (Read Only Memory) 803, a system bus 804, a hard disk controller 805, a keyboard controller 806, a serial interface controller 807, a parallel interface controller 808, a display controller 809, a hard disk 810, a keyboard 811, a serial peripheral device 812, a parallel peripheral device 813 and a display 814. Among these components, connected to the system bus 804 are the CPU 801, the RAM 802, the ROM 803, the hard disk controller 805, the keyboard controller 806, the serial interface controller 807, the parallel controller 808 and the monitor controller 809. The hard disk 810 is connected to the hard disk controller 805; the keyboard 811 is connected to the keyboard controller 806; the serial peripheral device 812 is connected to the serial interface controller 807; the parallel peripheral device 813 is connected to the parallel interface controller 808; and the display 814 is connected to the display controller 809.

Further, the embodiments of the present invention may be implemented in software, hardware or the combination thereof. The hardware part may be implemented by a special logic; the software part may be stored in a memory and executed by a proper instruction execution system such as a microprocessor or a dedicated designed hardware.

While the present invention has been described with reference to the embodiments of the present invention considered by far, it should be understood that the invention is not limited to the embodiments disclosed herein. On the contrary, all modifications and equivalent arrangements that come within the spirit and range of the appended claims are intended to be embraced therein. The scope of the appended claims is accorded the broadest interpretation to encompass all such modifications and equivalent structures and functions.

What is claimed is:

1. A computer-implemented method for recording an event in a virtual world, comprising the steps of:
   acquiring camera view regions of avatars joining in the event;
   identifying at least one key target based on information about the targets in the camera view regions of the avatars, the information about the targets in the camera view regions comprising at least one of frequencies, times and lengths of durations that the targets appear in the camera view regions; and
   setting at least one recorder for the identified at least one key target for recording the event such that the at least one key target is located in the camera view regions of the at least one recorder.

2. The method of claim 1, further comprising:
   grouping the key targets based on distances between them so the key targets, separated by distances which are less than a predefined threshold, are grouped into a same group;
   wherein the step of setting at least one recorder includes setting the recorders for each group such that the key targets in each group are located in respective camera view regions of the recorders.

3. The method of claim 1, wherein the step of setting at least one recorder includes setting the recorders such that the key targets are located in central positions of the camera view regions of the recorders.

4. The method of claim 1, wherein the step of setting at least one recorder includes setting the recorders such that faces of the key targets are located in the camera view regions of the recorders.

5. The method of claim 1, further comprising:
   setting a secondary recorder such that its camera view region is identical to the camera view regions of the avatar identified as the key target.

6. The method of claim 1, further comprising:
   setting a secondary recorder such that its camera view region includes targets that are not key targets.

7. The method of claim 1, further comprising:
   setting one or more overall scene recorders to record the overall scene of the event from different points of view.

8. Apparatus for recording an event in a virtual world, comprising:
   an acquisition device configured for acquiring camera view regions of avatars joining in the event;
   an identification device configured for identifying at least one key target based on information about the target in the camera view regions of the avatars, the information about the targets in the camera view regions comprising at least one of frequencies, times and lengths of durations that the targets appear in the camera view regions; and
   a setting device configured for setting for the identified key targets one or more recorders for recording the event such that the at least one key target is located in the camera view regions of the at least one recorder.

9. The apparatus of claim 8, further comprising:
   a grouping device configured for grouping the key targets based on distances between them so the key targets, the distances between which are less than a predefined threshold, are grouped into a same group;
   wherein the setting device is further configured for setting the recorders for each group such that the key targets in the each group are located in the respective camera view regions of the recorders.

10. The apparatus of claim 8, wherein the setting device is further configured for setting the recorders such that the key targets are located in central positions of the camera view regions of the recorders.

11. The apparatus of claim 8, wherein the setting device is further configured for setting the recorders such that faces of the key targets are located in the camera view regions of the recorders.

12. The apparatus of claim 8, wherein the setting device is further configured for setting a secondary recorder such that its camera view region is identical to the camera view region of the avatar identified as the key target.

13. The apparatus of claim 8, wherein the setting device is further configured for setting a secondary recorder such that its camera view region comprises non-key targets.

14. The apparatus of claim 8, wherein the setting device is further configured for setting one or more overall scene recorders so as to record the overall scene of the event from different points of view.

* * * * *